US012638817B2

(12) United States Patent
Ando et al.

(10) Patent No.: US 12,638,817 B2
(45) Date of Patent: May 26, 2026

(54) ELECTRIC POWER MANAGEMENT SYSTEM AND ELECTRIC POWER MANAGEMENT PROGRAM

(71) Applicant: Prime Planet Energy & Solutions, Inc., Tokyo (JP)

(72) Inventors: Masaru Ando, Seto (JP); Katsushi Saito, Nagakute (JP); Masanori Iechika, Toyota (JP); Hideyuki Nagai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 692 days.

(21) Appl. No.: 18/157,078

(22) Filed: Jan. 20, 2023

(65) Prior Publication Data

US 2023/0236562 A1 Jul. 27, 2023

(30) Foreign Application Priority Data

Jan. 21, 2022 (JP) ................................. 2022-008198

(51) Int. Cl.
G05B 19/042 (2006.01)
H02J 3/28 (2026.01)

(52) U.S. Cl.
CPC .............. *G05B 19/042* (2013.01); *H02J 3/28* (2013.01); *G05B 2219/2639* (2013.01)

(58) Field of Classification Search
CPC . G05B 19/042; G05B 2219/2639; H02J 3/28; H02J 2300/24; H02J 2310/64; H02J 3/00; H02J 3/008; H02J 3/32; H02J 3/38; H02J 3/381; G06Q 10/06315; G06Q 30/0201; G06Q 50/06
See application file for complete search history.

(56) References Cited

U.S. PATENT DOCUMENTS

| | | | | |
|---|---|---|---|---|
| 2003/0144864 A1* | 7/2003 | Mazzarella | .......... | G06Q 30/018 705/412 |
| 2005/0034023 A1* | 2/2005 | Maturana | ................ | H02J 3/008 714/37 |
| 2010/0332373 A1* | 12/2010 | Crabtree | ................ | G06Q 40/04 709/224 |

(Continued)

FOREIGN PATENT DOCUMENTS

| | | |
|---|---|---|
| JP | 2005-295670 A | 10/2005 |
| JP | 2012110192 A | 6/2012 |
| JP | 2016-119805 A | 6/2016 |

(Continued)

*Primary Examiner* — Ziaul Karim

(74) *Attorney, Agent, or Firm* — HAUPTMAN HAM, LLP

(57) ABSTRACT

The herein disclosed electric power management system includes a shared power supply, and an electric power selling process unit that is configured to control the electric power sell from the shared power supply to the external system, and a countervalue distributing unit that is configured to distribute a countervalue for the electric power sell to each of the plural users. Then, the countervalue distributing unit is configured to distribute the countervalue for the electric power sell so as to provide a larger countervalue of the electric power sell to an user whose electric power use amount from the shared power supply is smaller. By doing this, it is possible to provide a larger electric power sell countervalue to the user who has efforted to save the electric power.

14 Claims, 5 Drawing Sheets

1

(56) References Cited

U.S. PATENT DOCUMENTS

| | | | |
|---|---|---|---|
| 2016/0043594 A1* | 2/2016 | Yamaguchi | ............... H02J 3/14 |
| | | | 307/24 |
| 2017/0133879 A1* | 5/2017 | Eckhardt | ............. H02J 13/1323 |

FOREIGN PATENT DOCUMENTS

| | | | |
|---|---|---|---|
| WO | 2014/203478 A1 | 12/2014 |
| WO | 2017/013754 A1 | 1/2017 |

* cited by examiner

ELECTRIC POWER MANAGEMENT SYSTEM AND ELECTRIC POWER MANAGEMENT PROGRAM

CROSS REFERENCE TO RELATED APPLICATIONS

The present application claims the priority based on Japanese Patent Application No. 2022-8198 filed on Jan. 21, 2022, and the entire contents of this are incorporated in the present specification by reference.

BACKGROUND

1. Technical Field

The present disclosure relates to an electric power management system and an electric power management program. For more details, it relates to an electric power management system that manages electric power sell operation from a shared power supply, being shared by plural users, to an external system, and relates to an electric power management program that is for making a computer operate this electric power management system.

2. Description of the Related Art

For example, JP2012-110192 discloses an electric power supply system for multiple dwelling house that is configured to manage an electric power supply operation and an electric power selling process for a multiple dwelling house including plural dwelling units. This electric power supply system for multiple dwelling house includes a setting means for setting a rate of electric power storage, of electric power which is generated by a solar power generation apparatus shared with plural dwelling units (user), to a storage battery and of electric power sell to an electric power company, and includes a controlling means for controlling the electric power storage and the electric power sell according to the rate set by the setting means. In the electric power supply system including the configuration as described above, it is possible only by setting the rate of the electric power storage and of the electric power sell with the setting means to use the electric power according to user's intention.

SUMMARY

As describe in JP2012-110192, various electric power management systems are conventionally proposed that are configured to control the electric power sell operation from a shared power supply (electric power generating apparatus, electric power storage apparatus, or the like), being shared with plural users, to an external system. However, in the electric power management system as described above, it has not been discussed sufficiently about a method for distributing a countervalue (incentive) of the electric power sell operation to each user. For example, if the countervalue of the electric power sell operation is evenly distributed to each of users, a user, who has efforted to save the electric power so as to contribute in increasing an electric power selling amount, is relatively considered to suffer a loss. In that case, it tends to reduce user's motivation for saving the electric power.

The present disclosure has been made to solve the above described problem, and an object is to properly distribute the countervalue for the electric power sell operation between plural users who use a shared power supply.

A herein disclosed electric power management system includes a shared power supply, an electric power sell instruction unit, and a countervalue distributing unit. The shared power supply is configured to be capable of performing an electric power supply to respective residences of plural users and performing an electric power sell to an external system. The electric power sell instruction unit is configured to instruct a shared power supply to perform an electric power sell to an external system. The countervalue distributing unit is configured to distribute a countervalue for an electric power sell to each of plural users. Then, a countervalue distributing unit of the electric power management system as described above distributes a countervalue for an electric power sell to provide a larger countervalue for an electric power sell to an user whose electric power use amount from a shared power supply is smaller.

According to the electric power management system including the above described configuration, it is possible to provide a larger electric power sell countervalue to the user who has efforted to save the electric power and has contributed in increasing the electric power sell amount. By doing this, the countervalue for the electric power sell can be properly distributed between plural users who use the shared power supply, and thus it is possible to inhibit the reduction in the motivation for saving the electric power.

In a suitable aspect of the herein disclosed electric power management system, a shared power supply includes an electric power generating apparatus. By doing this, it is possible to sufficiently secure the electric power of the shared power supply, and to suitably perform both the electric power supply to respective residences and the electric power sell to the external system.

In a suitable aspect of the herein disclosed electric power management system, a shared power supply includes an electric power storage apparatus. By doing this, it is possible to sufficiently secure the electric power of the shared power supply, and to suitably perform both the electric power supply to respective residences and the electric power sell to the external system.

A suitable aspect of the herein disclosed electric power management system includes a supply and demand situation receiving unit and an electric power sell controlling unit. The supply and demand situation receiving unit is configured to receive an electric power demand and supply situation of an external system. The electric power sell controlling unit is configured to control an electric power sell instruction unit so as to start an electric power sell in a situation where an electric power shortage is caused on an external system. By doing this, it is possible to perform the electric power sell operation at the tight electric power time when the electric power sell price becomes higher, and thus it is possible to efficiently obtain the electric power sell countervalue.

A suitable aspect of the herein disclosed electric power management system includes a supply and demand situation receiving unit and a first correcting unit. The supply and demand situation receiving unit is configured to receive an electric power demand and supply situation of an external system. The first correcting unit is configured to correct distribution of a countervalue for an electric power sell so as to provide a larger countervalue for an electric power sell to a user whose electric power use amount is smaller in a situation where an electric power shortage is caused on an external system. In the aspect as described above, a larger electric power sell countervalue is provided to the user who has efforted to save the electric power, at the tight electric power time when the electric power sell price becomes higher. By doing this, it is possible to enhance the motivation for saving the electric power at the tight electric power time, so as to obtain a larger electric power sell countervalue.

A suitable aspect of the herein disclosed electric power management system includes a result storing unit and a second correcting unit. The result storing unit is configured to store a use result representing a past electric power use amount for each of plural users. The second correcting unit is configured to compare a previously set use reference value and a use result, and to correct distribution of a countervalue for an electric power sell so as to provide a larger countervalue for an electric power sell to a user whose number of use results being lower than the use reference value is larger. According to the aspect as described above, the past use result of each user can be reflected to the distribution of the electric power sell countervalue, and thus it is possible to enhance the motivation for continuously saving the electric power.

Additionally, in an aspect including the result storing unit and the second correcting unit, it is preferable that a second correcting unit corrects a distribution of a countervalue for an electric power sell so as to provide a further larger countervalue for an electric power sell to a user whose number of use results being continuously lower than the use reference value is larger. By doing this, it is possible to further enhance the motivation for continuously saving the electric power.

A suitable aspect of the herein disclosed electric power management system further includes an electric power buy processing unit that is configured to control an electric power buy from an external system. An electric power buy processing unit includes an available electric power setting unit, an electric power buying instruction unit, and a cost distributing unit. The available electric power setting unit is configured to set an available electric power of a shared power supply for each of plural users. The electric power buying instruction unit is configured to instruct a shared power supply to perform an electric power buy from an external system when a total use electric power of respective residences becomes more than a predetermined threshold. The cost distributing unit is configured to distribute a cost required for an electric power buy with a user, who has used electric power exceeding an available electric power, being treated as a target. According to the aspect as described above, it is possible to request the user, who has caused buying the electric power, to pay the cost required for buying the electric power. By doing this, it is possible to inhibit the payment of the electric power buying cost from being requested to the user who has efforted to save the electric power.

In addition, another aspect of the herein disclosed technique is to provide an electric power management program for making a computer perform an electric power sell from a shared power supply being shared with plural users to an external system. The electric power management program as described above is configured to make a computer perform a step for controlling an electric power sell from a shared power supply to an external system, and a step for distributing a countervalue for an electric power sell to each of plural users to provide a larger countervalue for an electric power sell to a user whose electric power use amount from a shared power supply is smaller. By using the electric power management program as described above, it is possible to easily construct the herein disclosed electric power management system.

DETAILED DESCRIPTION

Embodiment 1

Below, one embodiment of the herein disclosed technique will be explained, while referring to figures. Incidentally, the matters other than matters particularly mentioned in this specification, and required for practicing the present disclosure (for example, configuration of each equipment constructing an electric power management system, or the like) can be grasped as design matters of those skilled in the art based on the related art in the present field. The herein disclosed technique can be executed based on the contents disclosed in the present specification, and the technical common sense in the present field. Incidentally, in the figures referred by the following explanation, the members/parts providing the same effect are provided with the same numerals and signs.

1. Configuration of Electric Power Management System

Figure 1:
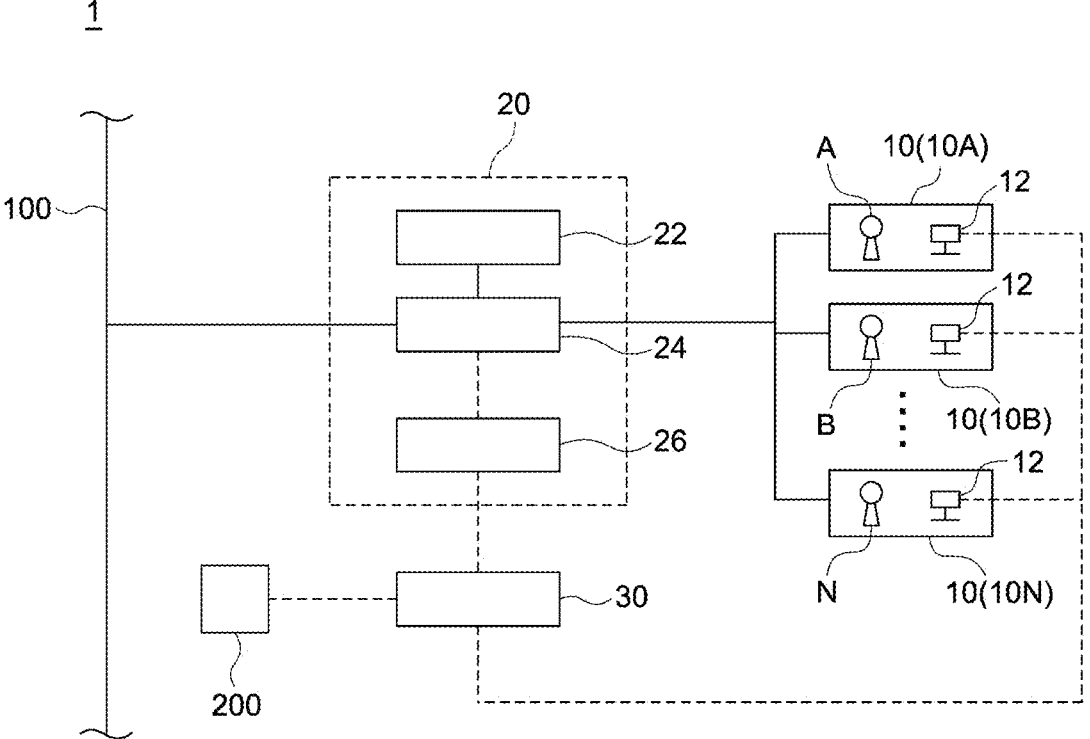
FIG. 1 is a conceptual view that shows an electric power management system in accordance with one embodiment.
Figure 2:
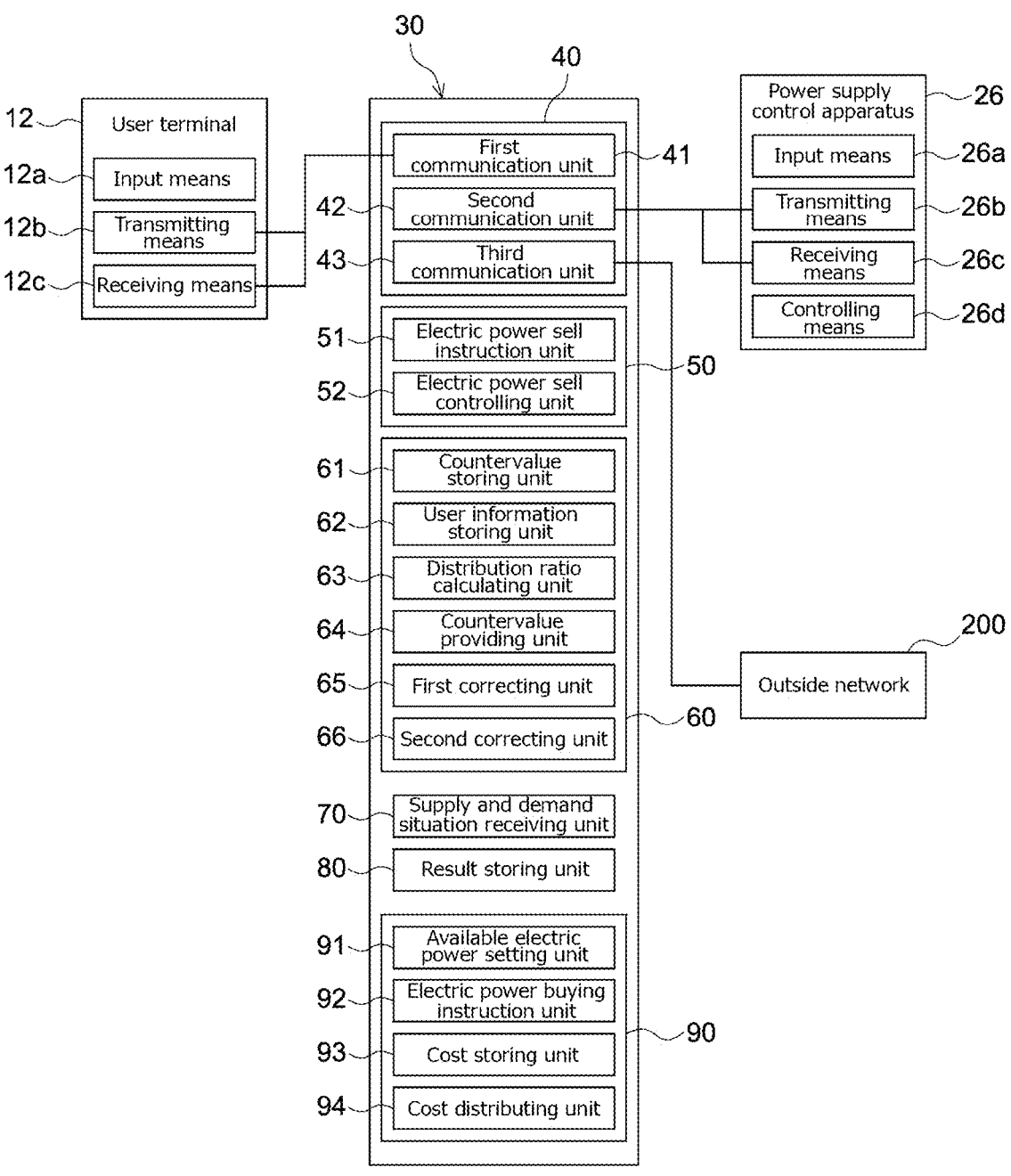
FIG. 2 is a block diagram that shows the electric power management system in accordance with one embodiment.

FIG. 1 is a conceptual view that shows an electric power management system in accordance with the present embodiment. In addition, FIG. 2 is a block diagram that shows an electric power management system in accordance with the present embodiment.

As shown in FIG. 1, the electric power management system 1 in accordance with the present embodiment includes residences 10 for respective users A to N, a shared power supply 20, and a system control apparatus 30. Below, each of the configurations will be described.

(1) Residence

As shown in FIG. 1, regarding the electric power management system 1 in accordance with the present embodiment, plural users A to N use the shared power supply 20. In other words, respective residences 10A to 10N for the users A to N are electrically connected to the shared power supply 20. Thus, respective residences 10A to 10N can use electric power supplied from the shared power supply 20. Incidentally, each of residences 10A to 10N might be a single house, or a single room of a multiple dwelling house (apartment, or the like). Additionally, a term "residence" in the present specification means a space used by a user, and does not require for the user to an actually live there. In other words, the term "residence" in the present specification semantically covers a building, such as office building and hotel, where a user temporarily stays, or covers a room. Incidentally, it is sufficient that the number of the residences 10A to 10N is plural (e.g., 2 or more) and the number is not particularly restricted.

Then, each of users A to N of the electric power management system 1 in accordance with the present embodiment possess a user terminal 12 that can communicate with the system control apparatus 30. As shown in FIG. 2, this user terminal 12 includes an input means 12a into which information related to electric power use of users A to N is input, a transmitting means 12b for transmitting the information input into the input means 12a to the system control apparatus 30, and a receiving means 12c for receiving the information from the system control apparatus 30. In addition, the user terminal 12 might include an image display means (display, or the like) for displaying various information. As one example of a particular configuration of the user terminal 12, it is possible to use a smartphone, a tablet terminal, a personal computer, or the like. However, the configuration of the user terminal 12 does not restrict the herein disclosed technique, and the configuration can be suitably changed as needed.

(2) Shared Power Supply

The shared power supply 20 is configured to be able to perform electric power supplying to respective residences 10A to 10N and to perform electric power selling to an external system 100. As shown in FIG. 1, the shared power supply 20 in the present embodiment includes an electric power generating apparatus 22 and an electric power storage apparatus 24. The electric power generating apparatus 22 is a private power generating equipment that is shared with plural users A to N. As the electric power generating apparatus 22, a conventionally known power generating equipment can be used without particular restriction. As one example of the electric power generating apparatus 22, it is possible to use a solar power generating apparatus, a gas electric power generating apparatus, a wind force electric power generating apparatus, or the like. Next, the electric power storage apparatus 24 is an electric power storage facility shared with plural users A to N. Even this electric power storage apparatus 24 is not particularly restricted, and a conventionally known electric power storage facility can be used without restriction. As for one example of the electric power storage apparatus 24, it is possible to use a battery pack or the like, in which plural secondary batteries, such as lithium ion secondary battery, nickel hydrogen storage battery, and lead storage battery, are connected. Then, the electric power storage apparatus 24 is electrically connected to the electric power generating apparatus 22, the external system 100, and each of the residences 10A to 10D. By doing this, the electric power generated by the electric power generating apparatus 22 can be stored in the electric power storage apparatus 24. Further, according to the above described configuration, it is possible to implement both the electric power supply operation to respective residences 10A to 10N and the electric power sell operation to the external system 100.

In addition, the shared power supply 20 in accordance with the present embodiment includes a power supply control apparatus 26 that can communication with the system control apparatus 30. As shown in FIG. 2, this power supply control apparatus 26 includes an input means 26a into which an input and output information of the electric power on the shared power supply 20 is input, a transmitting means 26b for transmitting the information input into the input means 26a to the system control apparatus 30, a receiving means 26c for receiving a signal from the system control apparatus 30, and a controlling means 26d for controlling charge and discharge of the electric power storage apparatus 24 based on the signal received by the receiving means 26c. This power supply control apparatus

26 is, for example, configured with a microcomputer attached to the electric power storage apparatus 24, or the like. This microcomputer includes, for example, an I/F, a CPU, a ROM, and a RAM.

(4) System Control Apparatus

The system control apparatus 30 is an apparatus that controls an operation of the electric power management system 1. As shown in FIG. 1, the system control apparatus 30 is connected to each user terminal 12 of users A to N, to the power supply control apparatus 26 of the shared power supply 20, and to an outside network 200 in a communication-capable manner. Incidentally, the system control apparatus 30 might be implemented by a single computer, or might be implemented by plural computers cooperating with each other.

As shown in FIG. 2, the system control apparatus 30 in the present embodiment includes a communication unit 40, an electric power selling process unit 50, a countervalue distributing unit 60, a supply and demand situation receiving unit 70, and a result storing unit 80. Below, each unit of the system control apparatus 30 will be described.

The communication unit 40 is a part configured to perform communication with another terminal or equipment. As shown in FIG. 2, the communication unit 40 in the present embodiment includes a first communication unit 41 that can communicate with the user terminal 12, a second communication unit 42 that can communicate with the power supply control apparatus 26, and a third communication unit 43 that can communicate with the outside network 200.

The electric power selling process unit 50 is a part configured to control the electric power sell operation from the shared power supply 20 to the external system 100. This electric power selling process unit 50 includes an electric power sell instruction unit 51 configured to instruct the shared power supply 20 to perform electric power selling (electric power supplying) to the external system 100. Although more details are described later, the power supply control apparatus 26 of the shared power supply 20 performs electric power selling from the electric power storage apparatus 24 to the external system 100 when receiving an electric power sell starting signal from the electric power sell instruction unit 51. Additionally, the electric power selling process unit 50 in the present embodiment further includes an electric power sell controlling unit 52 configured to control a timing of the electric power sell instruction unit 51 for transmitting the electric power sell starting signal.

The countervalue distributing unit 60 is a part configured to distribute countervalues of electric power sells respectively to plural users A to N. The term "countervalue of electric power sell" in the present specification means a reward paid for the electric power supply to the external system. The countervalue of the electric power sell is not restricted to money. The countervalue of the electric power sell might be a point exchangeable with a product or the like, discount in an electric power bill, or the like. In addition, the countervalue distributing unit 60 in the present embodiment includes a countervalue storing unit 61, a user information storing unit 62, a distribution ratio calculating unit 63, and a countervalue providing unit 64. The countervalue storing unit 61 is a part configured to store the electric power sell countervalue paid from an electric power sell counterparty. The user information storing unit 62 is a part configured to store an electric power amount (electric power use amount for each of users A to N) supplied from the shared power supply 20 to each of residences 10A to 10N. The distribution ratio calculating unit 63 is a part configured to calculate the distribution ratio of the electric power sell countervalue for each of users A to N. Then, the countervalue providing unit 64 is a part configured to respectively provide the countervalues to the users A to N based on the distribution ratio calculated by the distribution ratio calculating unit 63. Although more details are described later, the above described respective configurations cooperate with each other so that the countervalue distributing unit 60 in the present embodiment distributes the electric power sell countervalue to provide a larger electric power sell countervalue to a user whose electric power use amount from the shared power supply 20 is smaller. In addition, the countervalue distributing unit 60 in the present embodiment includes a first correcting unit 65 and a second correcting unit 66. These correcting units are parts configured to correct the distribution ratio calculated by the distribution ratio calculating unit 63.

Next, the supply and demand situation receiving unit 70 is a part configured to receive an electric power demand and supply situation of the external system. The information obtained by this supply and demand situation receiving unit 70 is used for controlling process performed by the electric power sell controlling unit 52, correcting process performed by the first correcting unit 65, or the like. In addition, the result storing unit 80 is a part configured to store a past electric power use amount (use result) of each user A to N. The use result stored in this result storing unit 80 is used for the correcting process performed by the second correcting unit 66.

Incidentally, each of the above described units can be implemented by a hardware of the system control apparatus 30 and a program stored in the hardware. In other words, according to the herein disclosed technique, an electric power management program is also provided to implement the system control apparatus (computer) including the above described configurations.

2. Electric Power Selling Process and Countervalue Distribution

Figure 3:
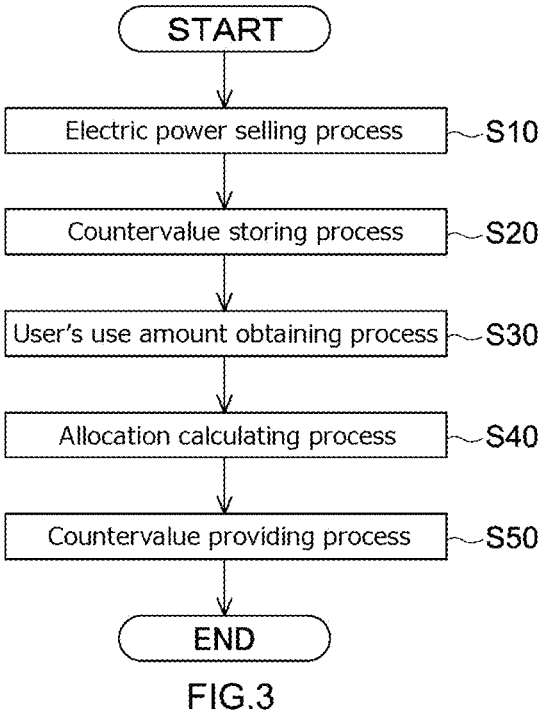
FIG. 3 is a flowchart that shows a processing procedure from electric power selling to countervalue providing on the electric power management system in accordance with one embodiment.
Figure 4:
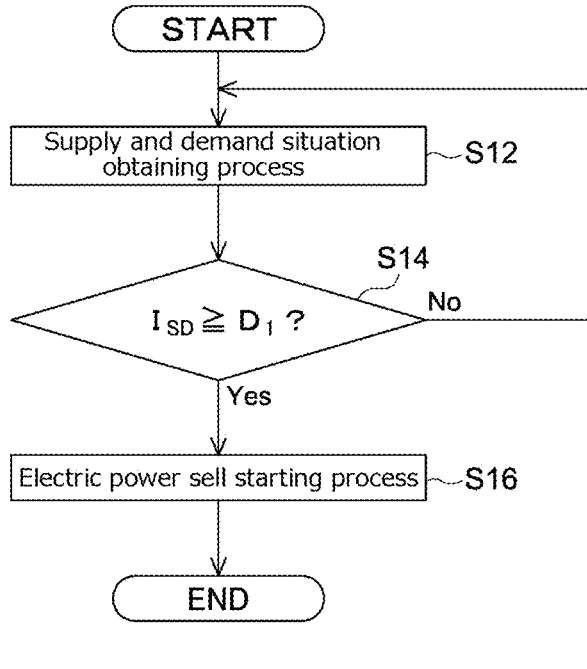
FIG. 4 is a flowchart that shows a processing procedure related to the electric power selling process on the electric power management system in accordance with one embodiment.
Figure 5:
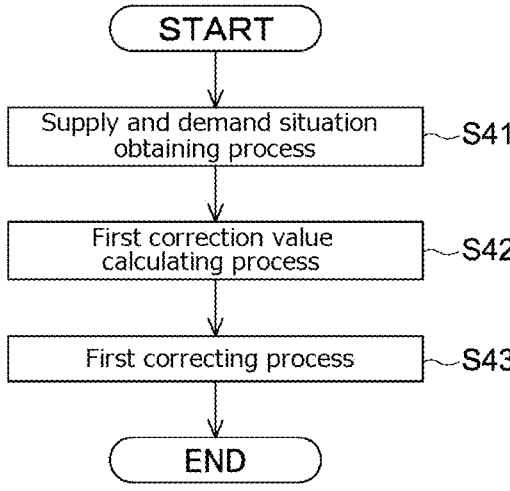
FIG. 5 is a flowchart that shows a correcting procedure of a distribution ratio by a first correcting unit.
Figure 6:
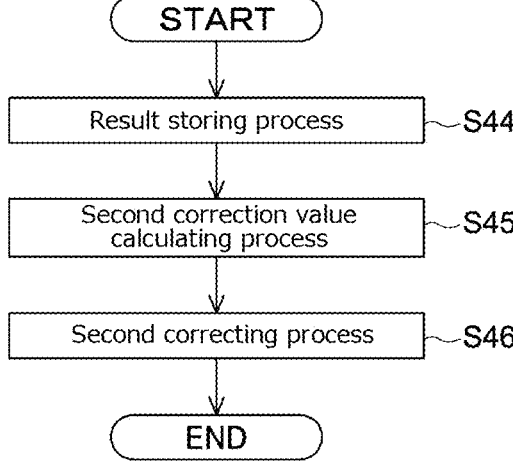
FIG. 6 is a flowchart that shows a correcting procedure of the distribution ratio by a second correcting unit.

Next, the electric power selling process and distribution of the countervalue on the electric power management system 1 including the above described configurations are explained while referring to FIG. 3 to FIG. 6. FIG. 3 is a flowchart that shows a processing procedure from selling the electric power to providing the countervalue on the electric power management system in accordance with the present embodiment. FIG. 4 is a flowchart that shows a processing procedure related to the electric power selling process on the electric power management system in accordance with the present embodiment. FIG. 5 is a flowchart that shows a correcting procedure of a distribution ratio by the first correcting unit. FIG. 6 is a flowchart that shows a correcting procedure of a distribution ratio by the second correcting unit.

(1) Electric Power Selling Process S10

As shown in FIG. 3, the electric power management system 1 in accordance with the present embodiment performs an electric power selling process S10 to perform electric power selling from the shared power supply 20 to the external system 100. In the present step, the electric power sell instruction unit 51 transmits an electric power sell starting signal to the power supply control apparatus 26 of the shared power supply 20 via the second communication unit 42. Then, the power supply control apparatus 26, which received the electric power sell starting signal, controls charge and discharge of the electric power storage apparatus 24 to transmit the electric power to the external system 100. Furthermore, the electric power sell instruction unit 51 transmits an electric power sell information (electric power selling person name, electric power sell amount, or the like) to an electric power sell counterparty via the third communication unit 43 and the outside network 200. Incidentally, the electric power sell counterparty herein is not restricted to an electric power company, and might be a specific person (semantically containing juridical person, or the like). In other words, the term "electric power sell" in the present specification semantically covers both an electric power sell operation in which the electric power transmission counterparty is not specified to supply the electric power to the external system so as to obtain the countervalue from the electric power company and an electric power sell operation in which electric power transmission is performed directly to a specific electric power sell counterparty via the external system so as to obtain the countervalue from the electric power sell counterparty.

Incidentally, the electric power management system 1 in accordance with the present embodiment is configured to start the electric power sell operation under a situation where shortage of the electric power is caused on the external system 100. In particular, as shown in FIG. 4, the electric power selling process S10 in the present embodiment includes a supply and demand situation obtaining process S12, a first deciding process S14, and an electric power sell starting process S16. Below, each of steps in the electric power selling process S10 is explained.

(a) Supply and Demand Situation Obtaining Process S12

This supply and demand situation obtaining process S12 is to obtain an electric power demand and supply situation on the external system 100. As described above, the system control apparatus 30 in the present embodiment includes the supply and demand situation receiving unit 70 configured to receive the electric power demand and supply situation on the external system. Particularly, into the system control apparatus 30 in the present embodiment, an information (supply and demand information $I_{SD}$) showing whether the shortage of the electric power is caused on the external system 100 or not is input via the outside network 200. Then, this supply and demand information $I_{SD}$ is stored in the supply and demand situation receiving unit 70 for a predetermined period. Incidentally, the supply and demand information $I_{SD}$ is not particularly restricted if being an information in which the electric power demand and supply situation on the external system is converted into a numerical value. As one example of the supply and demand information $I_{SD}$ it is possible to use an average value of differences between the electric power supply amount and the electric power demand for a predetermined period, an average value of electric power bills for a predetermined period, or the like.

(b) First Deciding Process S14

Next, the first deciding process S14 is to decide whether the electric power selling process S10 is started or not based on the electric power demand and supply situation (supply and demand information $I_{SD}$. Particularly, in the present step, the electric power sell controlling unit 52 obtains the supply and demand information $I_{SD}$ stored in the supply and demand situation receiving unit 70. Then, the electric power sell controlling unit 52 compares a previously set first threshold $D_1$ with the supply and demand information $I_{SD}$. When the comparison result shows that the supply and demand information $I_{SD}$ is less than the first threshold $D_1$ ($I_{SD} < D_1$), the electric power sell controlling unit 52 determines that the electric power sell countervalue becomes a low price since the electric power is sufficiently supplied to the external system 100. Thus, the electric power sell controlling unit 52 does not start electric power selling. In that case, the electric power sell controlling unit 52 repeatedly performs the supply and demand situation obtaining process S12 and the first deciding process S14 (No at S14). On the other hand, when the supply and demand information $I_{SD}$ is equal to or more than the first threshold $D_1$ ($I_{SD} \geq D_1$), the electric power sell controlling unit 52 determines that the electric power sell countervalue becomes a high price since an electric power shortage is caused on the external system 100. In that case, the electric power sell controlling unit 52 proceeds the step to the electric power sell starting process S16 (Yes at S14).

(c) Electric Power Sell Starting Process S16

The electric power sell starting process S16 is to control the electric power sell instruction unit 51 so as to start electric power selling. Particularly, in the present step, the electric power sell controlling unit 52 controls the electric power sell instruction unit 51 to transmit an electric power sell starting signal to the power supply control apparatus 26. Then, as described above, the power supply control apparatus 26, which received the electric power sell starting signal, controls the charge and discharge of the electric power storage apparatus 24 to transmit the electric power to the external system 100. As described above, the electric power management system 1 in accordance with the present embodiment controls the electric power sell instruction unit 51 so as to start electric power selling at a situation (tight electric power time) in which the electric power shortage is caused on the external system. By doing this, it is possible to perform electric power selling at the time when the electric power sell price becomes high. As this result, it is possible to efficiently obtain the electric power sell countervalue.

(2) Distributing Process

Next, the electric power management system 1 in accordance with the present embodiment performs a distributing process for distributing the electric power sell countervalue X obtained by the electric power selling process S10 to each of users A to N. As shown in FIG. 3, the distributing process in the present embodiment includes a countervalue storing process S20, a user's use amount obtaining process S30, an allocation calculating process S40, and a countervalue providing process S50. Below, each of the steps will be described.

(a) Countervalue Storing Process S20

At the present step, the electric power sell countervalue X obtained at the electric power selling process S10 is stored. Particularly, the electric power sell counterparty having received the electric power sell information in the electric power selling process S10 transmits the electric power sell countervalue X to the system control apparatus 30 via the outside network 200. The electric power sell countervalue X as described above is stored in the countervalue storing unit 61 of the countervalue distributing unit 60. Although not restricting the herein disclosed technique, it is preferable that the system control apparatus 30 continuously adds the electric power sell countervalues X having been received, for example, during a predetermined period (e.g., one month). By doing this, the electric power sell countervalues X during a constant period can be distributed together, and thus it is possible to simplify the process related to distributing and providing the electric power sell countervalue X.

(b) User's Use Amount Obtaining Process S30

At the present step, the electric power use amount from the shared power supply 20 for each of users A to N is obtained. The electric power management system 1 in accordance with the present embodiment continuously transmits the electric power amounts, having been supplied to respective residences 10A to 10N from the shared power supply 20, to the system control apparatus 30 as "electric power use amounts $E_A$ to $E_N$ of respective users". Then, the system control apparatus 30 stores these electric power use amounts $E_A$ to $E_N$ in the user information storing unit 62. Incidentally, when the electric power sell countervalues X for a predetermined period are distributed together, it is preferable that the user information storing unit 62 performs a process in which the electric power use amounts $E_A$ to $E_N$ for the predetermined period are added and the added resultant of the electric power use amounts $E_A$ to $E_N$ and the electric power sell countervalues X for the same predetermined period are associated.

(c) Allocation Calculating Process S40

At the present step, the electric power sell countervalues X are distributed to respective users based on the electric power use amounts $E_A$ to $E_N$, and electric power sell countervalues $X_A$ to $X_N$ to respective users A to N are calculated. Particularly, in this allocation calculating process S40, the distribution ratio calculating unit 63 of the countervalue distributing unit 60 obtains respective user's electric power use amounts $E_A$ to $E_N$ from the user information storing unit 62. Then, the distribution ratio calculating unit 63 calculates distribution ratios $R_A$ to $R_N$ to respective users A to N based on these respective user's electric power use amounts $E_A$ to $E_N$. In particular, a user whose electric power use amount is smaller efforts to save the electric power and contributes in increasing the electric power sell amount. Thus, calculation is performed to make the distribution ratio for the user, whose electric power use amount is smaller, be relatively higher. On the other hand, a user whose electric power use amount is larger poorly contributes in electric power selling and thus this user's distribution ratio is calculated to be relatively lower. Next, the distribution ratio calculating unit 63 obtains the electric power sell countervalue X from the countervalue storing unit 61. Then, the distribution ratio calculating unit 63 multiplies each of the distribution ratios $R_A$ to $R_N$ and the electric power sell countervalue X, so as to calculate the electric power sell countervalues $X_A$ to $X_N$ for respective users A to N.

(d) Countervalue Providing Process S50

At the present step, the electric power sell countervalues $X_A$ to $X_N$ calculated by the distribution ratio calculating unit 63 are provided to respective users A to N. Incidentally, a means for providing the electric power sell countervalues $X_A$ to $X_N$ to respective users A to N is not particularly restricted, and thus it is possible to use various conventionally known means. For example, when the electric power sell countervalues $X_A$ to $X_N$ are money, it is preferable that the countervalue providing unit 64 transmit a signal that indicates to pay the electric power sell countervalues $X_A$ to $X_N$ into bank accounts of respective users A to N, via the third communication unit 43 and the outside network 200.

As described above, the electric power management system 1 in the present embodiment is configured to calculate the electric power sell countervalues $X_A$ to $X_N$ for respective users A to N, based on respective user's electric power use amounts $E_A$ to $E_N$. By doing this, it is possible to provide the larger electric power sell countervalue to the user who efforts to save the electric power and contributes in increasing the electric power sell amount. As this result, the electric power sell countervalues X can be properly distributed to plural users A to N using the shared power supply 20, and thus it is possible to inhibit reduction in motivation for saving the electric power.

(3) Distribution Ratio Correction

Next, the electric power management system 1 in accordance with the present embodiment includes a correcting unit (first correcting unit 65, and second correcting unit 66) configured to correct the distribution ratios $R_A$ to $R_N$ calculated by the distribution ratio calculating unit 63. Below, the correction of the distribution ratio performed by the correcting unit will be described.

(a) Correction by First Correcting Unit

FIG. 5 is a flowchart that shows a correcting procedure of the distribution ratio performed by the first correcting unit 65. As shown in this FIG. 5, the correcting process performed by the first correcting unit 65 includes a supply and demand situation obtaining process S41, a first correction value calculating process S42, and a first correcting process S43.

The correcting process by the first correcting unit 65 firstly performs the supply and demand situation obtaining process S41 for obtaining the electric power demand and supply situation on the external system 100. This supply and demand situation obtaining process S41 can be performed by the same procedure as the supply and demand situation obtaining process S12 (see FIG. 4) in the above described electric power selling process S10. In other words, the present process also stores the information (supply and demand information $I_{SD}$), related to the electric power demand and supply situation having been input via the outside network 200, in the supply and demand situation receiving unit 70.

Next, in the first correction value calculating process S42, a first correction value is calculated on the basis of the information related to the electric power demand and supply situation and the electric power use information of respective users A to N. In particular, the first correcting unit 65 is configured to obtain the supply and demand information $I_{SD}$ from the supply and demand situation receiving unit 70 and further receive the electric power use information of respective users A to N from the user information storing unit 62. Then, the first correcting unit 65 compares the electric power use information of respective users A to N and the supply and demand information $I_{SD}$, and then calculates the first correction value to provide the larger electric power sell countervalue to the user whose electric power use amount is smaller at the situation where the electric power shortage is caused on the external system. In particular, a user, who saved the electric power so as to have increased the electric power sell amount at the tight electric power time, can be recognized as a person who contributed in enhancing the electric power sell countervalue. The first correcting unit 65 is configured to calculate the first correction value to increase the distribution ratio of the user who has saved the electric power at the tight electric power time. Incidentally, a particular means for calculating the first correction value is not particularly restricted. For example, it is possible to use a procedure in which a first correction table, setting a correspondence relation with the user's electric power use situation, the supply and demand information $I_{SD}$, and the first correction value, is stored in the first correcting unit 65, and in which the first correction value is calculated on the basis of this first correction table.

Then, in the first correcting process S43, the distribution ratios $R_A$ to $R_N$ of respective users A to N are corrected on the basis of the first correction value calculated by the first correcting unit 65. In particular, the first correction value having been calculated is transmitted to the distribution ratio calculating unit 63. The distribution ratio calculating unit 63 uses the first correction value to correct the distribution ratios $R_A$ to $R_N$ calculated in the allocation calculating process S40 (see FIG. 3), and multiplies the distribution ratio $R_A$ to $R_N$ having been corrected and the electric power sell countervalue X so as to calculate the electric power sell countervalues $X_A$ to $X_N$ for the respective users A to N. By doing this, it is possible to distribute the larger electric power sell countervalue to the user who has saved the electric power at the tight electric power time and has contributed in increasing the electric power sell countervalue. As described above, by correcting distribution of the electric power sell countervalue based on the electric power demand and supply situation, it is possible to enhance the motivation for saving the electric power at the tight electric power time and to obtain the larger electric power sell countervalue.

(b) Correction by Second Correcting Unit

FIG. 6 is a flowchart that shows a correcting procedure of the distribution ratio performed by the second correcting unit 66. As shown in FIG. 6, the correcting process performed by the second correcting unit 66 includes a result storing process S44, a second correction value calculating process S45, and a second correcting process S46.

The result storing process S44 is to store a use result Y representing the past electric power use amount for each of users A to N. As described above, the system control apparatus 30 is configured to store the electric power use amounts $E_A$ to $E_N$ of respective users in the user information storing unit 62. Then, the user information storing unit 62 in the present embodiment is configured to store the information, in which respective user's electric power use amounts $E_A$ to $E_N$ for a predetermined period are added, as an use result Y. As one example, the user information storing unit 62 can be set to store one year's worth of one month use result Y. In that case, the user information storing unit 62 stores twelve month's worth of use result (use results $Y_1$ to $Y_{12}$) by one user. For convenience sake, in the following explanation, a correcting process using these 12 use results $Y_1$ to $Y_{12}$ is referred as an example for explanation. However, the period for obtaining the use results does not restrict the herein disclosed technique.

Next, the second correction value calculating process S45 is to calculate a second correction value based on use results of respective users A to N. In particular, the second correcting unit 66 is configured to obtain the use results $Y_1$ to $Y_{12}$ for respective users A to N from the user information storing unit 62. The second correcting unit 66 compares a previously set use reference value and each of the use results $Y_1$ to $Y_{12}$. As for this use reference value, a general electric power use amount for a period (one month in the present embodiment) to obtain the use result, or the like, can be used. Then, a user having the above described plural use results $Y_1$ to $Y_{12}$, many of which are lower than the use reference value, is determined to continuously save the electric power and contribute in increasing the electric power sell amount for a long period. Thus, the second correcting unit 66 is configured to calculate the second correction value to increase the distribution ratio of the user having the use results $Y_1$ to $Y_{12}$, many of which are lower than the use reference value. Incidentally, even a particular means for calculating the second correction value is not restricted particularly. For example, it is possible to use a procedure in which a second correction table setting the correspondence relation between a number of use results Y lower than the use reference value and the second correction value is stored in the second correcting unit 66 and in which the second correction value is calculated on the basis of the second correction table.

Then, the second correcting process S46 is to correct the distribution ratios $R_A$ to $R_N$ of respective users A to N based on the second correction value calculated by the second correcting unit 66. In particular, the second correction value having been calculated is transmitted to the distribution ratio calculating unit 63. The distribution ratio calculating unit 63 is configured to use the second correction value so as to correct the distribution ratio $R_A$ to $R_N$ calculated in the allocation calculating process S40 (see FIG. 3), and to multiply the distribution ratio $R_A$ to $R_N$ having been corrected and the electric power sell countervalue X so as to calculate the electric power sell countervalues $X_A$ to $X_N$ for the respective users A to N. By doing this, it is possible to distribute the larger electric power sell countervalue to the user who continuously contributes in increasing the electric power sell amount. As described above, by correcting distribution of the electric power sell countervalue based on the past use result, it is possible to enhance motivation for continuously saving the electric power. Incidentally, in addition, it is further preferable that the second correcting unit 66 corrects the distribution ratios $R_A$ to $R_N$ based on the number of use results happening to be lower than the use reference value continuously among the use results $Y_1$ to $Y_{12}$. By doing this, it is possible to further enhance the motivation for continuously saving the electric power.

2. Electric Power Buying Process and Cost Distribution

Above, the electric power selling process and the countervalue distribution on the electric power management system 1 in accordance with the present embodiment are explained. Incidentally, although the herein disclosed technique is not restricted, it is preferable that the electric power management system 1 is configured to be able to receive the electric power (buy the electric power) from the external system to the shared power supply and to distribute the cost required for buying the electric power to the respective users A to N. Below, the electric power buying process and the cost distribution on the electric power management system 1 in accordance with the present embodiment will be described.

At first, as shown in FIG. 2, the system control apparatus 30 of the electric power management system 1 in the present embodiment includes an electric power buy processing unit 90 configured to control buying the electric power from the external system 100. This electric power buy processing unit 90 includes an available electric power setting unit 91, an electric power buying instruction unit 92, a cost storing unit 93, and a cost distributing unit 94. The available electric power setting unit 91 is a part configured to set an available electric power of the shared power supply 20 to each of plural users A to N. In addition, the electric power buying instruction unit 92 is a part configured to instruct buying the electric power from the external system 100 to the shared power supply 20 when a total use electric power of respective residences 10A to 10N becomes larger than a predetermined threshold. The cost storing unit 93 is a part configured to store a cost having been required for the above described electric power buying operation. Then, the cost distributing unit 94 is a part configured to distribute the cost of the electric power buying operation while targeting a user who has used the electric power exceeding the available electric power range. The electric power buy processing unit 90 in the present embodiment, by having these parts cooperate together, distributes the electric power buying cost so as to request a larger electric power buying cost to the user whose electric power use amount from the shared power supply 20 is larger.

Figure 7:
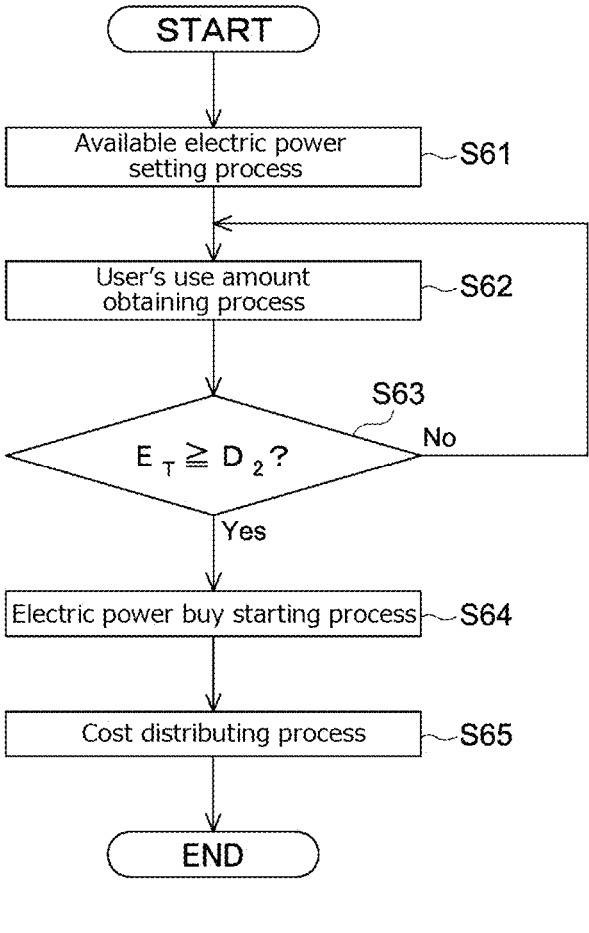
FIG. 7 is a flowchart that shows a procedure from electric power selling to payment requesting on the electric power management system in accordance with one embodiment.

Below, the electric power buying process and the cost distribution on the electric power management system 1 in accordance with the present embodiment will be explained while referring to FIG. 7. FIG. 7 is a flowchart that shows a procedure from electric power selling to payment requesting on the electric power management system in accordance with the present embodiment. As shown in FIG. 7, the electric power buying process of the electric power management system 1 in accordance with the present embodiment includes an available electric power setting process S61, a user's use amount obtaining process S62, a second deciding process S63, an electric power buy starting process S64, and a cost distributing process S65. Below, each of the steps will be described.

(a) Available Electric Power Setting Process S61

At the present step, available electric powers $L_A$ to $L_N$ are set for plural users A to N, respectively. Then, these available electric powers $L_A$ to $L_N$ are stored in the available electric power setting unit 91. Incidentally, a means for setting the available electric powers $L_A$ to $L_N$ is not particularly restricted. For example, a total supply electric power from the shared power supply 20 might be divided by a number of the users A to N and the resultant value might be treated as the available electric power $L_A$ to $L_N$. In addition, the available electric power setting unit 91 might be configured to be capable of setting a larger available electric power for a specific user than the other users by a payment for an additional charge.

(b) User's Use Amount Obtaining Process S62

As shown in FIG. 7, the electric power management system 1 in accordance with the present embodiment performs the user's use amount obtaining process S62, when the electric power buying process is performed, too. Incidentally, regarding the user's use amount obtaining process S62 herein, it is possible to use a procedure similar to the user's use amount obtaining process S30 (see FIG. 3) in the distributing process.

(c) Second Deciding Process S63

The second deciding process S63 is to decide whether buying the electric power from the external system 100 is performed or not. Particularly, in the present step, the electric power buying instruction unit 92 of the electric power buy processing unit 90 obtains electric power use amounts $E_A$ to $E_N$ of respective residences 10A to 10N from the user information storing unit 62. Then, the electric power buying instruction unit 92 calculates a total value (total use electric power $E_T$) of respective electric power use amounts $E_A$ to $E_N$, and compares the resultant with a previously set second threshold $D_2$. This second threshold $D_2$ is a threshold set to be a value lower than the total electric power amount of the shared power supply 20. Then, as the comparison result of these values, when the total use electric power $E_T$ has been less than the second threshold $D_2$ ($E_T < D_2$), the electric power buying instruction unit 92 determines that the electric power is supplied to respective residences 10A to 10N without shortage and thus buying the electric power is not started. At that situation, the electric power buying instruction unit 92 repeatedly performs the user's use amount obtaining process S62 and the second deciding process S63 (No at S63). On the other hand, when the total use electric power $E_T$ is equal to or more than the second threshold $D_2$ ($E_T \geq D_2$), the electric power buying instruction unit 92 determines that the total use electric power $E_T$ of respective residences 10A to 10N becomes closer to the total electric power amount of the shared power supply 20 and thus there is a fear that shortage of electric power supply to each of residences 10A to 10N is caused, and then it proceeds to the electric power buy starting process S64 (Yes at S63). Incidentally, it is preferable that the second threshold $D_2$ at the present step is set within a range 75% to 95% of the total electric power amount of the shared power supply 20. By doing this, it is possible to implement buying the electric power from the external system 100, before the shortage of the electric power amount is caused on the shared power supply 20 and then power failures are caused on respective residences 10A to 10N.

(d) Electric Power Buy Starting Process S64

At the present step, the electric power buying instruction unit 92 instructs the shared power supply 20 to buy the electric power from the external system 100. In particular, the electric power buying instruction unit 92 is configured to transmit the electric power buying start signal to the power supply control apparatus 26 of the shared power supply 20 via the second communication unit 42. Then, the power supply control apparatus 26 having received the electric power buying start signal controls the charge and discharge of the electric power storage apparatus 24 to make the electric power be supplied from the external system 100. Furthermore, the electric power buying instruction unit 92 transmits an electric power buying information (electric power buyer name, electric power buying amount, or the like) to the electric power company via the third communication unit 43 and the outside network 200. By doing this, an information related to the electric power buying cost is transmitted from the electric power company to the system control apparatus 30. Then, the system control apparatus 30 stores the received electric power buying cost in the cost storing unit 93.

(e) Cost Distributing Process S65

Next, the electric power management system 1 in accordance with the present embodiment performs the cost distributing process S65 for distributing the electric power buying cost to respective residences. In this cost distributing process S65, the cost distributing unit 94 obtains the available electric powers $L_A$ to $L_N$ for respective users A to N from the available electric power setting unit 91 and further obtains the electric power use amounts $E_A$ to $E_N$ of respective users A to N from the user information storing unit 62. Then, the cost distributing unit 94 compares the available electric powers $L_A$ to $L_N$ and the electric power use amounts $E_A$ to $E_N$ for respective users A to N, and treats users, whose electric power use amounts $E_A$ to $E_N$ exceed the available electric powers $L_A$ to $L_N$, as targets of payment request. Furthermore, the cost distributing unit 94 calculates excess amounts ($E_A$–$L_A$ to $E_N$–$L_N$) of the electric power use amounts $E_A$ to $E_N$ with respect to the available electric powers $L_A$ to $L_N$. Then, to request a larger electric power buying cost to a user whose excess amount is larger, the electric power buying costs stored in the cost storing unit 93 are distributed. Then, regarding the user targeted for the request of the electric power buying cost, a notification of requesting payment of electric power buying cost after the distribution is transmitted to the user terminal 12.

As described above, the electric power management system 1 in accordance with the present embodiment is configured to distribute the electric power buying cost while the users exceeding the available electric powers $L_A$ to $L_N$ are treated as the target. By doing this, it is possible to request the cost required for buying the electric power to the user who used a large amount of electric power and caused buying the electric power. By doing this, it is possible to inhibit the electric power buying cost from being requested to the user who efforted saving the electric power.

Another Embodiment

Above, one embodiment of the herein disclosed technique has been explained. Incidentally, the above described embodiment is an example to which the herein disclosed technique is applied, and thus does not restrict the herein disclosed technique.

For example, as shown in FIG. 1, the shared power supply 20 in the above described embodiment includes the electric power generating apparatus 22 and the electric power storage apparatus 24. However, "shared power supply" in the herein disclosed technique is sufficient to include a configuration capable of supplying the electric power to respective residences and selling the electric power to the external system, and is not restricted to the form including both the electric power generating apparatus and the electric power storage apparatus. For example, even in the form using the shared power supply that includes only the electric power generating apparatus, it is possible to distribute and supply the electric power to each residence and additionally to directly sell the electric power generated by the electric power generating apparatus to the external system. In addition, in the form using the shared power supply that includes only the electric power storage apparatus, it is possible to electrically store the electric power, generated by the electric power generating apparatus of each user, in a shared electric power storage apparatus. In that case, it is possible to distribute and supply the electric power from the shared electric power storage apparatus (shared power supply) to each residence, and further to sell the electric power from the electric power storage apparatus to the external system. As described above, even in the case where the shared power supply including only one among the electric power generating apparatus and the electric power storage apparatus is used, it is possible to properly implement the herein disclosed technique. In addition, the herein disclosed technique is not to inhibit each user, who uses the electric power management system including the above described configuration, from personally possessing the electric power storage apparatus or the electric power generating apparatus. In other words, respective residences 10A to 10N in FIG. 1 might be connected to a power supply (electric power storage apparatus, electric power generating apparatus, or the like) different from the shared power supply 20.

In addition, as shown in FIG. 4, the electric power management system 1 in accordance with the above described embodiment is configured to control the timing for starting the electric power sell operation based on the electric power demand and supply situation of the external system 100. However, as described above, the electric power sell starting control shown in FIG. 4 has a purpose of efficiently obtaining the electric power sell countervalue by performing the electric power sell at the tight electric power time when the electric power sell price becomes higher. Thus, even in a case where this electric power sell starting control is not performed, the effect of the herein disclosed technique (appropriate distribution of electric power sell countervalue) is not inhibited. In other words, the herein disclosed technique can be applied even to an electric power management system that performs electric power selling at a previously set electric power selling time (e.g., 24 o'clock, everyday).

In addition, as shown in FIG. 5 and FIG. 6, the electric power management system 1 in accordance with the above described embodiment performs the correcting processes for correcting the distribution ratios $R_A$ to $R_N$ calculated by the distribution ratio calculating unit 63. However, these correcting processes are not essential processes for implementing the effect of the herein disclosed technique. For example, even when the electric power sell countervalue is distributed on the basis of only the electric power use amount from the shared power supply, it is possible to sufficiently and properly distribute the electric power sell countervalue between plural users.

In addition, as shown in FIG. 7, the electric power management system 1 in accordance with the above described embodiment is configured to be capable of distributing the electric power buying cost based on the use electric power amount of each user. However, this distribution of the electric power buying cost is not an essential process for implementing the effect of the herein disclosed technique. Even in a case where this distribution of the electric power buying cost shown in FIG. 7 is not performed, it is possible to provide a larger electric power sell countervalue to the user who has efforted to save the electric power and has contributed in increasing the electric power sell amount, and thus it is possible to properly distribute the electric power sell countervalue between the plural users. Additionally, in a case where a specific user has used too much electric power and thus the electric power sell operation has not been performed, the electric power management system might provide a benefit different from the countervalue of the electric power sell to the user who has efforted to save the electric power. As for the benefit different from the electric power sell countervalue described above, it is possible to use a preferential distribution for the next time electric power sell countervalue or to provide a preferential use authority for the next time shared power supply.

Although the present disclosure is explained above in details, the above described explanation is merely an illustration. In other words, the herein disclosed technique contains ones in which the above described specific examples are deformed or changed.

What is claim is:

1. A electric power management system comprising:
   a shared power supply that is configured to be capable of performing an electric power supply to respective residences of plural users and performing an electric power sell to an external system;
   an electric power sell instruction unit that is configured to instruct the shared power supply to perform the electric power sell to the external system; and
   a countervalue distributing unit that is configured to distribute a countervalue for the electric power sell to each of the plural users, wherein
   the countervalue distributing unit distributes the countervalue for the electric power sell to provide a first countervalue for the electric power sell to a first user of the plurality of users whose electric power use amount from the shared power supply is a first electric power use amount, wherein the first countervalue is greater than a second countervalue for the electric power sell to a second user of the plurality of users whose electric power use amount from the shared power supply is a second electric power use amount, and the second electric power use amount is greater than the first electric power use amount;
   a supply and demand situation receiving unit that is configured to receive an electric power demand and supply situation of the external system; and an electric power sell controlling unit that is configured to control the electric power sell instruction unit so as to start the electric power sell in a situation where an electric power shortage is caused on the external system.

2. The electric power management system according to claim 1, wherein
   the shared power supply comprises an electric power generating apparatus.

3. The electric power management system according to claim 1, wherein
   the shared power supply comprises an electric power storage apparatus.

4. An electric power management program for making a computer perform an electric power sell from a shared power supply being shared with plural users to an external system, configured to make the computer implement the operations of the electric power management system of claim 1.

5. A electric power management system comprising:
   a shared power supply that is configured to be capable of performing an electric power supply to respective residences of plural users and performing an electric power sell to an external system;
   an electric power sell instruction unit that is configured to instruct the shared power supply to perform the electric power sell to the external system; and
   a countervalue distributing unit that is configured to distribute a countervalue for the electric power sell to each of the plural users, wherein
   the countervalue distributing unit distributes the countervalue for the electric power sell to provide a first countervalue for the electric power sell to a first user of the plurality of users whose electric power use amount from the shared power supply is a first electric power use amount, wherein the first countervalue is greater than a second countervalue for the electric power sell to a second user of the plurality of users whose electric power use amount from the shared power supply is a second electric power use amount, and the second electric power use amount is greater than the first electric power use amount;
   a supply and demand situation receiving unit that is configured to receive an electric power demand and supply situation of the external system; and
   a first correcting unit that is configured to correct distribution of the countervalue for the electric power sell so as to provide the first countervalue for the electric power sell to the first user whose electric power use amount is the first electric power use amount in a situation where an electric power shortage is caused on the external system.

6. The electric power management system according to claim 5, wherein
   the shared power supply comprises an electric power generating apparatus.

7. The electric power management system according to claim 5, wherein
   the shared power supply comprises an electric power storage apparatus.

8. A electric power management system comprising:
   a shared power supply that is configured to be capable of performing an electric power supply to respective residences of plural users and performing an electric power sell to an external system;

an electric power sell instruction unit that is configured to instruct the shared power supply to perform the electric power sell to the external system; and a countervalue distributing unit that is configured to distribute a countervalue for the electric power sell to each of the plural users, wherein the countervalue distributing unit distributes the countervalue for the electric power sell to provide a first countervalue for the electric power sell to a first user of the plurality of users whose electric power use amount from the shared power supply is a first electric power use amount, wherein the first countervalue is greater than a second countervalue for the electric power sell to a second user of the plurality of users whose electric power use amount from the shared power supply is a second electric power use amount, and the second electric power use amount is greater than the first electric power use amount;

a result storing unit that is configured to store a use result representing a past electric power use amount for each of the plural users; and a second correcting unit that is configured to compare a previously set use reference value and the use result, and to correct distribution of the countervalue for the electric power sell so as to provide the first countervalue for the electric power sell to a user of the plurality of users whose number of the use results is lower than the use reference value.

9. The electric power management system according to claim 8, wherein the second correcting unit corrects the distribution of the countervalue for the electric power sell so as to provide a further larger countervalue for the electric power sell to the user whose number of the use results continuously lower than the use reference value is larger.

10. The electric power management system according to claim 8, wherein the shared power supply comprises an electric power generating apparatus.

11. The electric power management system according to claim 8, wherein the shared power supply comprises an electric power storage apparatus.

12. A electric power management system comprising:

a shared power supply that is configured to be capable of performing an electric power supply to respective residences of plural users and performing an electric power sell to an external system;

an electric power sell instruction unit that is configured to instruct the shared power supply to perform the electric power sell to the external system; and a countervalue distributing unit that is configured to distribute a countervalue for the electric power sell to each of the plural users, wherein the countervalue distributing unit distributes the countervalue for the electric power sell to provide a first countervalue for the electric power sell to a first user of the plurality of users whose electric power use amount from the shared power supply is a first electric power use amount, wherein the first countervalue is greater than a second countervalue for the electric power sell to a second user of the plurality of users whose electric power use amount from the shared power supply is a second electric power use amount, and the second electric power use amount is greater than the first electric power use amount;

an electric power buy processing unit that is configured to control the electric power buy from the external system, wherein the electric power buy processing unit comprises:

an available electric power setting unit that is configured to set an available electric power of the shared power supply for each of the plural users;

an electric power buying instruction unit that is configured to instruct the shared power supply to perform the electric power buy from the external system when a total use electric power of the respective residences becomes more than a predetermined threshold; and a cost distributing unit that is configured to distribute a cost required for the electric power buy with a user of the plurality of users, who has used electric power exceeding the available electric power, being treated as a target.

13. The electric power management system according to claim 12, wherein the shared power supply comprises an electric power generating apparatus.

14. The electric power management system according to claim 12, wherein the shared power supply comprises an electric power storage apparatus.

* * * * *